United States Patent Office 2,800,298
Patented July 23, 1957

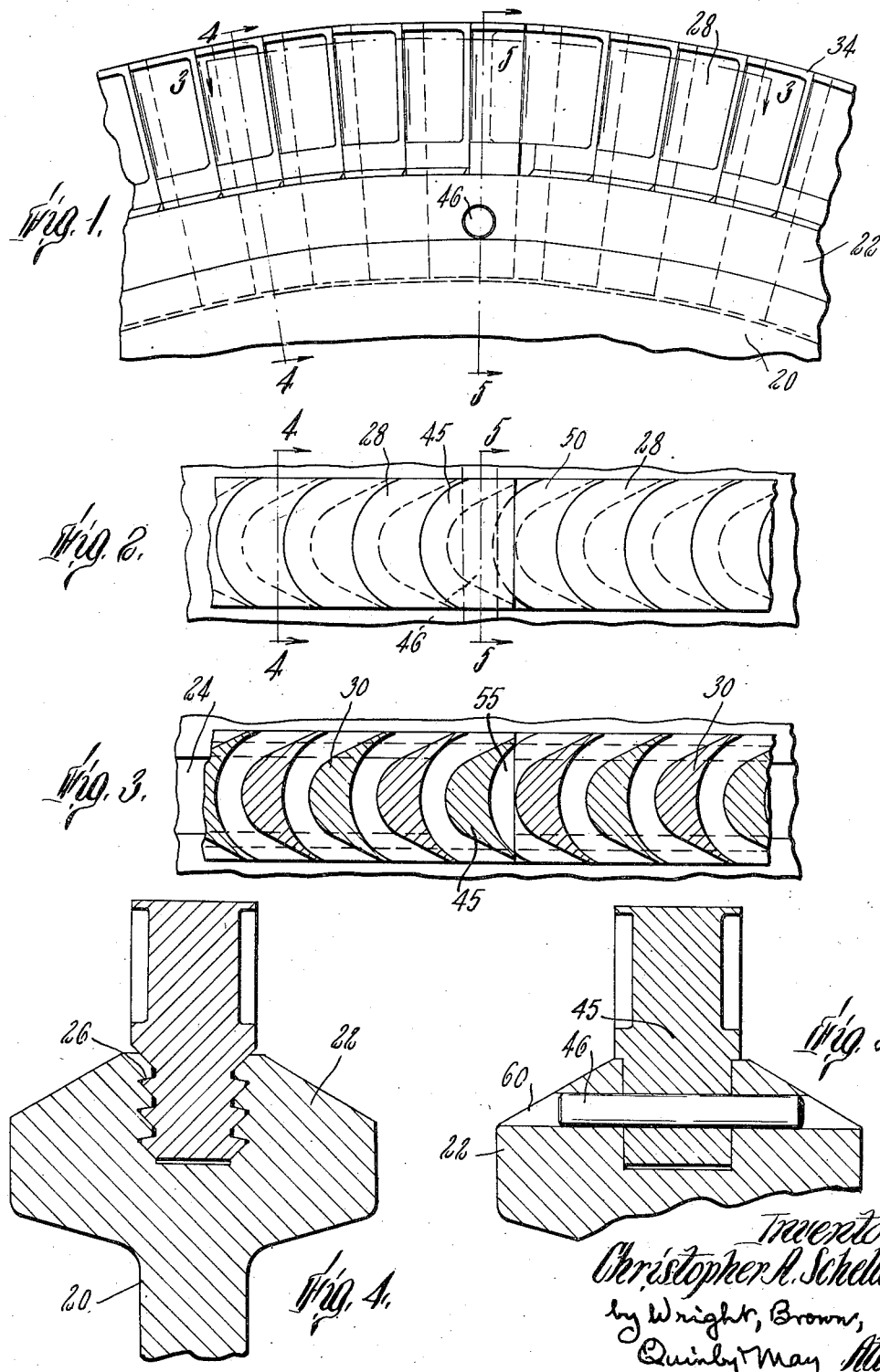

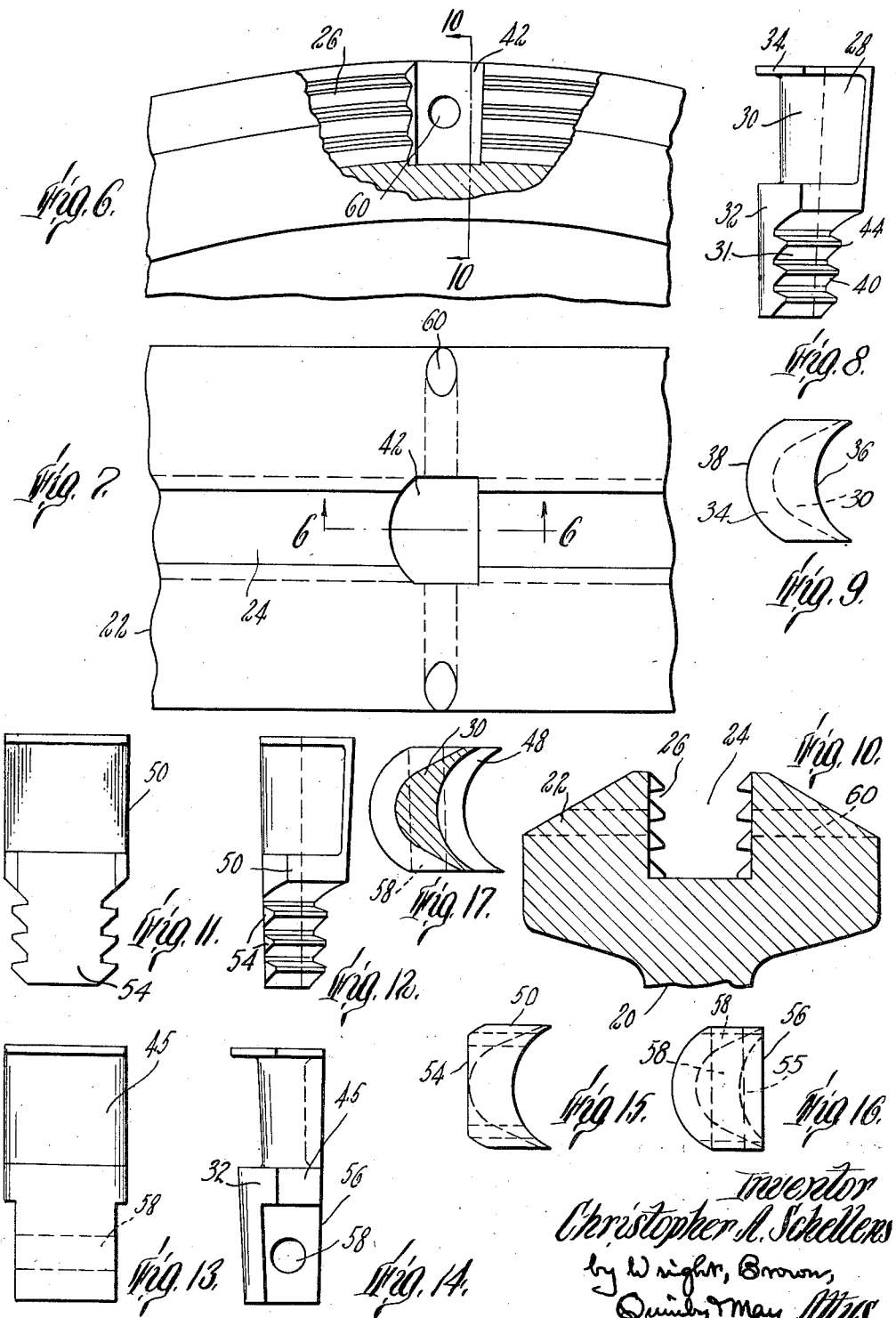

2,800,298

TURBINE WHEEL

Christopher A. Schellens, St. George, Maine, assignor to Schellens-True Corporation, Ivoryton, Conn., a corporation of Connecticut Application April 19, 1951, Serial No. 221,811

2 Claims. (Cl. 253—77)

This invention relates to turbine wheels or drums and especially to steam turbine wheels or drums having a circumferential channel in the rim to receive the roots of the blades or buckets to be assembled thereon. In particular, the invention relates to a steam turbine wheel having undercut grooves in the walls of its circumferential channel to receive teeth or ridges formed on sides of the roots of the buckets so as to anchor the buckets securely in such a manner as to resist effectively the centrifugal stresses to which the buckets are subjected when the wheels or drum is rotated. More particularly, the invention relates to turbine wheels all the buckets of which, with the exception of one or two, consist of a blade, a root and a band, the blade and root each having a concave cylindrical surface on one side and a convex cylindrical surface on the other side. The concave surfaces of the blade and root are a continuous cylindrical surface having the same curvature. The convex surface of the root with respect to the convex surface of the blade is offset outward in the direction of the circumference of the turbine wheel, the outwardly projecting portion of the root being hereinafter referred to as the skirt of the bucket. The ordinary bucket has but one skirt and that is on the convex side, but a special bucket may have two skirts if the root projects in the circumferential direction beyond both faces of the blade.

In order to introduce the roots of the buckets into the channel, a radial slot or keyhole, which closely fits the enlarged root of a key bucket to be described hereinafter, is cut at one point in the wheel rim for admitting the root of a bucket which is inserted until its ridges register with the undercut grooves. The bucket can then be pushed along the periphery of the wheel to clear the slot for the insertion of other buckets, one by one, until the channel is filled, except for the slot itself. The key bucket completes the series of buckets which extends around the circumference of the wheel. Since the key bucket has no ridges on the sides of its root to interlock with undercut grooves in the channel, as do the other buckets, a pin is employed to secure the said key bucket in place and to oppose centrifugal stresses thereon. This pin is inserted in a direction parallel to the axis of the wheel and extends through the root of the key bucket and through the adjacent portion of the wheel rim. The location of this pin must be determined with care as it is necessary that it be substantially in line with the center line of centrifugal force acting on the bucket. Since such force may be of considerable magnitude, the diameter of the pin should be as large as it can be made without excessively weakening the portion of the root through which the hole is drilled to receive the pin. The cross-sectional area of the root of the key bucket is thus a limiting factor on the speed at which the wheel can be rotated, especially when the buckets employed are of the type having their mutually abutting faces cylindrically shaped as hereinafter described.

An object of this invention is to modify the structure of the key bucket in such a manner as to strengthen the root so that a pin of correspondingly larger size can be used to anchor the key bucket to the wheel.

According to the invention, the root of the key bucket can be strengthened by increasing the pitch of the bucket and correspondingly increasing the dimension of the root in the circumferential direction. Such increase in the pitch should not be too large as it adversely affects the balance of the wheel as a whole and the pattern of steam flow through the spaces between the buckets. The pitch of a bucket is considered to be the distance between corresponding points on blades of adjacent buckets measured on the arc of the circle passing through said points, the center of which is in the axis of the wheel carrying the bucket. Increase of root size obtained in this manner may be sufficient for wheels which are to be operated at low or moderate speeds, but for high speed rotation additional metal may be obtained for the root of the key bucket by taking from the skirt of a next adjacent bucket some of the metal thereof which is relatively ineffective in anchoring the root in the channel, as hereinafter described. As a result of such transfer of skirt metal, the interfaces of contact between the key bucket and the mating bucket from which the skirt metal was taken, do not have the cylindrical curvature of the interfaces between the other buckets in the series, but are of lesser curvature or even plane.

For a more complete understanding of the invention, reference may be had to the following description thereof, and to the drawings, of which—

Figure 1 is a fragmentary elevation of a turbine wheel embodying the invention;

Figure 2 is a fragmentary edge view of the same;

Figure 3 is a section on the line 3—3 of Figure 1;

Figure 4 is a section on the line 4—4 of Figures 1 and 2;

Figure 5 is a section on the line 5—5 of Figures 1 and 2;

Figure 6 is a fragmentary elevation of the wheel shown in Figure 1, but with no buckets, a portion being broken away to show portions in section on the line 6—6 of Figure 7;

Figure 7 is an edge view of the wheel portion shown in Figure 6;

Figure 8 is a side elevation of one of the series of buckets to be mounted on the wheel;

Figure 9 is an end view of the same;

Figure 10 is a section on the line 10—10 of Figure 6;

Figure 11 is a front elevation of a modified bucket to abut the key bucket;

Figure 12 is a side elevation of the same;

Figure 13 is a front elevation of the key bucket;

Figure 14 is a side elevation of the same;

Figure 15 is an end view of the mating or abutting bucket shown in Figures 11 and 12;

Figure 16 is an end view of the key bucket shown in Figures 13 and 14; and

Figure 17 is a sectional view of a modified form of key bucket.

Figure 1 shows a portion of a turbine wheel 20 having a rim 22 in which is cut a circumferential slot or channel 24, the walls of which are grooved, as at 26 (Figures 4 and 10), these grooves being undercut to anchor the buckets 28 which are mounted therein. A typical bucket is shown in Figures 8 and 9, this bucket consisting of a blade 30 having a root 31 with a skirt 32 projecting beyond the convex side of the blade, and a band portion 34 preferably on the convex side of the blade. The roots of these buckets are preferably formed with concave and convex cylindrical surfaces where they abut the next adjacent buckets, and the blades 30 have concave and convex surfaces on corresponding sides of the bucket. The driven side is concave, as indicated at 36 in Figure 9, the other side 38 being convex. The sides of the root 31 are grooved so as to form a series of ridges 40 which fit into the grooves 26 of the wheel rim.

In assembling the buckets on the rim of the wheel, they are inserted one by one into a radial keyhole 42 which is of sufficient size to receive the root of a bucket 28 when inserted in a radial direction. When the root of a bucket has been inserted into the keyhole, such as is shown in Figures 6 and 7, until the ridges 40 register with the grooves 26, the bucket is pushed preferably toward the left around the wheel along the channel 24 until it is in a position a short distance to the right of the keyhole shown in Figures 6 and 7. The bucket is pushed in such direction because the sharp points 44 at the ends of the ridges 40 make it difficult to move it in the opposite direction along the channel 24.

When all of the ordinary buckets 28 have been thus inserted in the channel 24, a key bucket 45 is inserted radially in the keyhole 42 and is anchored therein by a pin 46 (Figure 5). The pin 46 is made as large as possible without unduly weakening the root of the key bucket which must have a hole therethrough large enough to receive the pin.

In designing a key bucket for use in a wheel which is to be operated at comparatively high speeds, metal may be taken from the next adjacent bucket to the right, hereinafter referred to as the "mating" bucket 50, for enlarging the root of the key bucket with little or no increase in the pitch of the key bucket.

As may be seen from Figure 8, the skirt 32 of the ordinary bucket 28 has relatively little value in anchoring the bucket in the channel 24, since it projects to the left beyond the ridges 40 by which the bucket is held against the centrifugal force acting on it when the wheel is rotated. Hence the skirt of the ordinary bucket and also the corresponding portion of the band 34 can be trimmed or cut off to form on the root a convex face of less curvature or a plane face 54, as shown in Figures 11 and 12. If the face 54 is plane, its plane is tangent to the convex face of the blade.

The key bucket 45 (Figures 13, 14 and 16) may be regarded as an ordinary bucket which has been modified by filling the grooves between the ridges 40 on the root and by adding to the concave face of the root metal equivalent to that trimmed from the skirt of an ordinary bucket to make a mating bucket 50. Since the key bucket retains the skirt 32 of an ordinary bucket, the metal added to the other side of the root constitutes a second skirt 55 which projects beyond the concave face of the blade in the circumferential direction. The face 56 of this second skirt is complemental to the face 54 of the mating bucket, so that if the face 54 is plane, the face 56 is also plane. This additional metal on the root of the key bucket makes possible a relatively large pin hole 58 in the root of the key bucket to receive a pin 46 of equal diameter, the rim of the wheel being drilled when the key bucket has been inserted, to form a hole 60 in the rim and the hole 58 in the key bucket skirt. As is evident from Figure 14, the hole 58 can be effectively located in the line of centrifugal force which acts radially outward on the key bucket through the center of mass thereof.

For moderate speeds of operation a key bucket may be made, as shown in Figure 17, with additional metal 48 in its root resulting in a second skirt situated on the side of the blade opposite to that of the normal skirt, or in the instance shown, on the concave side of the blade, the curvature of the added skirt being such as to nest with the convex curvature of the skirt of the adjacent ordinary bucket, no special mating bucket being required. The keyhole (not shown) closely fits the enlarged root. It will be seen that the pitch or dimension of the root in the direction of the circumference of the wheel has been increased. Furthermore, the spacing between the key bucket blade and the next adjacent blade on its concave side has been increased. For moderate speeds, however, where the need for increased skirt metal to provide strength is small, the resultant disturbance in the balance of the wheel as a whole and in the pattern of steam flow may not be objectionable.

It is to be noted that in both types of key bucket depicted in Figures 13 and 14, as well as in Figure 17, the pitch of the key bucket root may be increased slightly by moving the convex contour thereof to the left while still providing a location for the hole for the pin which is substantially in line with the resultant of the centrifugal forces acting on the various parts of the key bucket.

I claim:

1. In a turbine wheel having a circumferential channel in its rim with undercut grooves in the side walls of the channel and a radial keyhole in the rim, a series of buckets each having a blade and a root with convex faces on one side of the bucket and concave faces on the other side, the concave faces of said blade and root forming a continuous cylindrical surface, the root of each said bucket having a skirt projecting in the circumferential direction beyond the convex face of the blade and ridges fitting into said undercut grooves, a key bucket having a blade with convex and concave faces and a root with a skirt on the convex side fitted into said keyhole, said key bucket having a second skirt projecting in the circumferential direction beyond the concave face of the blade, and a pin extending through the root of said key bucket in a direction parallel to the axis of the wheel and through the rim of the wheel.

2. In a turbine wheel having a circumferential channel in its rim with undercut grooves in the side walls of the channel and a radial keyhole in the rim, a series of buckets each having a blade and a root with convex faces on one side of the bucket and concave faces on the other side, the concave faces of said blade and root forming a continuous cylindrical surface, the root of each said bucket having a skirt projecting in the circumferential direction beyond the convex face of the blade and ridges fitting into said undercut grooves, a key bucket having a blade with convex and concave faces and a root with a skirt on the convex side fitted into said keyhole, a mating bucket having a blade with convex and concave faces and a root abutting the root of said key bucket, the mutually abutting faces of said key bucket and mating bucket being substantially plane and tangent to the convex face of the blade of the mating bucket whereby the volume of the root of the key bucket is augmented on the concave side of the bucket by an amount equal to that which would be subtracted from an ordinary bucket in changing it to a mating bucket, and a pin extending through the root of the key bucket and through the adjacent metal of the wheel rim.

References Cited in the file of this patent

UNITED STATES PATENTS

| 729,889 | Parker | June 2, 1903 |
| 1,387,304 | Parsons | Aug. 9, 1921 |
| 1,545,495 | Holzwarth | July 14, 1925 |
| 2,391,623 | Heppner | Dec. 25, 1945 |
| 2,393,447 | Allen | Jan. 22, 1946 |

FOREIGN PATENTS

| 35,766 | Switzerland | July 5, 1906 |
| 658,445 | Germany | Nov. 26, 1935 |